(12) United States Patent
Cui et al.

(10) Patent No.: US 7,792,157 B2
(45) Date of Patent: Sep. 7, 2010

(54) METHOD, SYSTEM AND DEVICE FOR CLOCK TRANSMISSION BETWEEN SENDER AND RECEIVER

(75) Inventors: Xiuguo Cui, Shenzhen (CN); Guizhen Xin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 294 days.

(21) Appl. No.: 11/865,364

(22) Filed: Oct. 1, 2007

(65) Prior Publication Data
US 2008/0240169 A1    Oct. 2, 2008

(30) Foreign Application Priority Data
Oct. 9, 2006    (CN) .................... 2006 1 0140221

(51) Int. Cl.
*H04J 3/06* (2006.01)
(52) U.S. Cl. .................. 370/516; 370/503; 725/104
(58) Field of Classification Search .................. None
See application file for complete search history.

(56) References Cited

U.S. PATENT DOCUMENTS

| | | | |
|---|---|---|---|
| 6,898,213 B1 | 5/2005 | Shimelmitz et al. | |
| 2001/0005361 A1 | 6/2001 | Lipsanen | |
| 2004/0258099 A1 | 12/2004 | Scott et al. | |
| 2005/0100054 A1* | 5/2005 | Scott et al. | 370/503 |
| 2007/0041324 A1* | 2/2007 | Shenoi | 370/235 |
| 2007/0201491 A1* | 8/2007 | Kapon | 370/395.62 |
| 2009/0007201 A1* | 1/2009 | Eerenberg et al. | 725/104 |

FOREIGN PATENT DOCUMENTS

| | | |
|---|---|---|
| CN | 1421075 A | 5/2003 |
| EP | 1 455 473 A2 | 9/2004 |
| WO | WO 2005/081434 A1 | 9/2005 |

OTHER PUBLICATIONS

Stein et al., "TDM over IP," *Internet Engineering Task Force*, pwe(4): 1-46 (Sep. 21, 2005), http://draft-ietf-pwe-tdmoip-04.txt.

* cited by examiner

*Primary Examiner*—Phuc Tran
(74) *Attorney, Agent, or Firm*—Leydig, Voit & Mayer, Ltd (57) ABSTRACT

Embodiments of the present invention provide a method, system and device for clock transmission between a sender and a receiver. The sender generates clock information of a clock to be sent relative to a system clock and sends a data packet containing the clock information to the receiver over a Packet-Switched Network (PSN). The receiver obtains the clock information in the data packet received and obtains the clock sent by the sender according to the clock information and the system clock. According to the embodiments of the present invention, after the clock of the sender is transmitted over the PSN, the receiver may obtain the clock of the sender without being affected by such damage as a network delay jitter and a packet loss.

16 Claims, 5 Drawing Sheets

METHOD, SYSTEM AND DEVICE FOR CLOCK TRANSMISSION BETWEEN SENDER AND RECEIVER

This application claims priority to Chinese Patent Application No. 200610140221.4, filed Oct. 9, 2006, which is hereby incorporated by reference.

FIELD OF THE INVENTION

The present invention relates to communication technologies, and particularly, to a method, system and device for the clock transmission between a sender and a receiver.

BACKGROUND OF THE INVENTION

The conventional clock transmission is usually realized by a constant bit rate stream. For example, the external clock of the telecommunication equipment is transmitted through the constant bit rate stream, such as a Synchronous Digital Hierarchy (SDH) signal, or a Synchronous Optical Network (SONET) signal, or a Plesiochronous Digital Hierarchy (PDH) signal.

With the development of data services, that a Time Division Multiplex (TDM) service is transmitted through a Packet-Switched Network (PSN) has become a new focus of the industry. In such an application, the clock of the TDM service should be transmitted over the PSN. Because the packet service is a burst non-constant bit rate stream and the PSN is an asynchronous network, how to transmit and restore a clock over the PSN is a problem in the application of transmitting the TDM service in the PSN.

Figure 1:
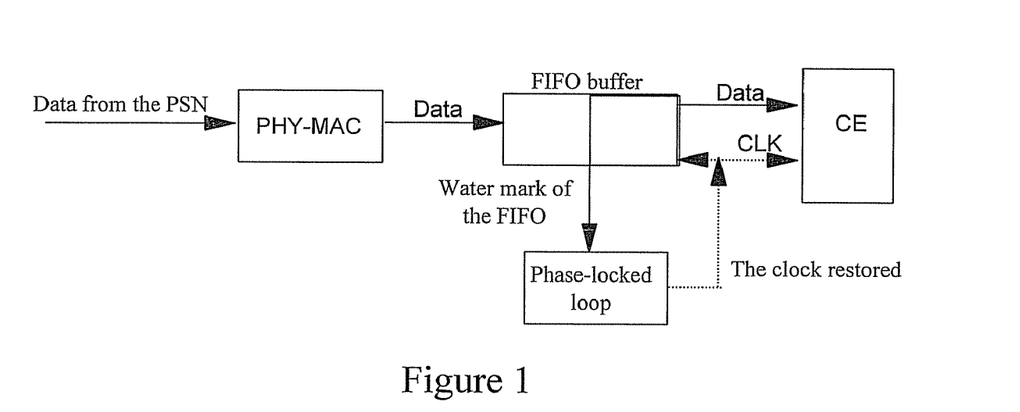
FIG. 1 is a diagram illustrating the principle of a conventional method for restoring the clock of a TDM service.

When the TDM service is transmitted over the PSN, according to a conventional method for restoring the clock of the TDM service, the clock of the TDM service is restored by circuit simulation. FIG. 1 is a diagram illustrating the principle of a conventional method for restoring the clock of the TDM service. As shown in FIG. 1, data packets are sent using the clock of the TDM service at the sender, while at the receiver, the data packets are received through First In First Out (FIFO) and the clock of the TDM service is restored according to the frequency of the data packets received and the state of the FIFO. The process is described below.

The sender sends the data packets at a rate synchronized with the clock of the TDM service, and the data packets are transmitted to the receiver over the PSN. The receiver performs the physical layer PHY and Media Access Control (MAC) parsing for the data packets received. The data obtained through parsing are first stored in an FIFO buffer at a rate equal to the rate at which the data packets arrive, that is, equal to the frequency at which the sender sends the data packets in a normal condition.

The data in the FIFO is transmitted to the Client Equipment (CE) by using the clock restored locally. The local clock is generated through filtering by a phase-locked loop (PLL) according to the state of the FIFO, that is, the clock output of the PLL is adjusted by the filling degree of the FIFO. More specifically, the frequency of clock output of the PLL becomes slower if the FIFO buffer is becoming empty; on the contrary, the frequency of clock output of the PLL becomes faster if the FIFO buffer tends to overflow.

In the PSN, there are some impairments, e.g., packet transfer delay and delay variation, packet loss, packet error, etc. According to the conventional method for restoring the clock of the TDM service, these impairments make the state of the water mark of the FIFO always fluctuate at random greatly, which has a detrimental effect on the jitter and wander quality of the restored clock.

In general, an internal clock of telecommunication equipment is distributed through a square wave signal such as the Transistor-Transistor Logic (TTL) level signal or the Low Voltage Differential Signal (LVDS) level signal. Moreover, there is only one system clock in a synchronization network element and the system clock is distributed to all the line cards from the timing card through the backboard. However, in the Optical Transport Network (OTN) switched system, the clock must be switched together with the service. Thus, a clock switched matrix should be established. It is however difficult to implement the clock switching because the frequency of the OTN clock is very high. And the cost of the clock switched matrix is also very high.

SUMMARY OF THE INVENTION

According to embodiments of the present invention, a method, a system and a device for clock transmission between a sender and a receiver are provided so that a clock of the sender can be restored at the receiver without being affected by such impairments as Packet Delay Variation (PDV) and packet loss.

A method for clock transmission between a sender and a receiver includes:

generating, by a sender, clock information of a clock relative to a system clock and sending a data packet containing the clock information over a Packet-Switched Network (PSN), where the clock is a clock to be sent by the sender;

obtaining, by a receiver, the clock information in the data packet received and obtaining the clock sent by the sender according to the clock information and the system clock.

A system for clock transmission between a sender and a receiver includes:

a first device as a sender, for generating clock information of a clock relative to a system clock and sending a data packet containing the clock information over a Packet-Switched Network (PSN); and a second device as a receiver, for obtaining the clock information in the data packet sent by the first device, and obtaining the clock sent by the first device according to the clock information and the system clock.

A device for clock transmission includes one or more components for generating clock information of a clock relative to a system clock and sending a data packet containing the clock information over a Packet-Switched Network (PSN) to a second device; where the second device obtains the clock information in the data packet and obtains the clock sent by the device according to the clock information and the system clock.

Another device for clock transmission includes one or more components for obtaining clock information of a clock relative to a system clock in a data packet received, and obtaining the clock according to the clock information and the system clock, where the clock is sent by a second device.

As can be seen from the embodiments of the present invention, the sender generates the clock information in the data packet and sends the data packet to the receiver, and the receiver obtains the clock of the sender according to the clock information. Thus, the clock of the sender may be obtained by the receiver without being affected by such impairments as PDV and packet loss. Thereby, the clock transmission between the sender and the receiver is achieved.

According to the embodiments of the present invention, the clock restoring can be implemented in the application of transmitting a TDM service or a synchronous clock over a PSN or an Asynchronous Transfer Mode (ATM) network.

EMBODIMENTS OF THE INVENTION

Embodiments of the present invention provide a method, a system and a device for clock transmission between a sender and a receiver in a PSN. According to the embodiments, the sender obtains clock information of a clock to be sent relative to a system clock, includes the clock information in a data packet and sends the data packet to the receiver over the PSN; the receiver restores the clock sent by the sender according to the clock information in the data packet received and the system clock.

The sender device and the receiver device may obtain a common clock synchronized with one clock source. The clock source is called the system clock in the embodiments of the present invention.

In an embodiment of the present invention, the sender device sends the data packet containing the clock information to the receiver device over the PSN, and the receiver device restores the clock of the sender according to the clock information in the data packet received. The embodiments of the present invention may be applied to restoring the clock when a TDM service or a synchronous clock is transmitted over the PSN, and may also be applied inside a device to processing the clock switching and distribution over the packet switched matrix in the device. The PSN may include such networks as an Ethernet, an IP network, a Digital Subscriber Line Access Multiplexer (DSLAM) network, a Passive Optical Network (PON), an Asynchronous Transfer Mode (ATM) network and a packet switched matrix in a device.

Figure 2:
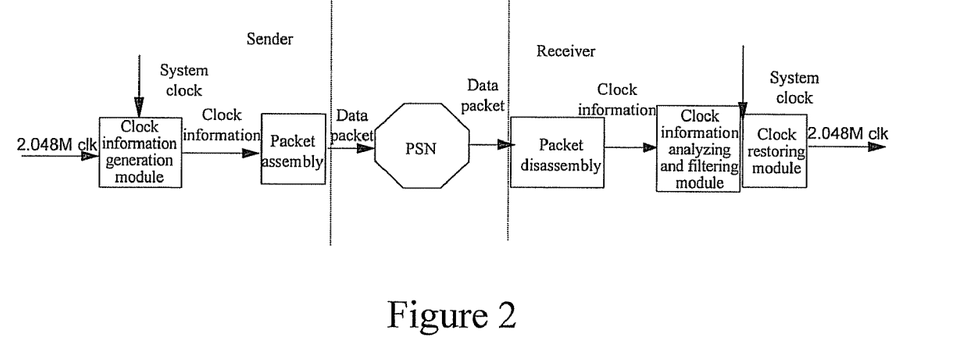
FIG. 2 is a diagram illustrating the structure of a system of timing over PSN in accordance with an embodiment of the present invention.

The embodiments of the present invention are hereinafter described in detail with reference to the drawings, taking restoring the clock, when a synchronous clock is transmitted over the PSN, as an example. FIG. 2 is a diagram illustrating the structure of a system of timing over the PSN in accordance with an embodiment of the present invention. As shown in FIG. 2, the system includes a sender device and a receiver device.

The sender device adapts the rate of a synchronous clock to be sent to the rate of the system clock using a container and obtains the clock information of the synchronous clock relative to the system clock. The sender device includes the clock information into a data packet and sends the data packet to the receiver device.

The sender device includes a clock information generation module and a packet assembly module.

The clock information generation module introduces a container according to the rate of the synchronous clock to be sent, adapts the rate of the synchronous clock to the rate of the system clock using the container and obtains the clock information of the synchronous clock compared with the system clock, and then transmits the clock information to the packet assembly module.

The packet assembly module encapsulates the clock information transmitted by the clock information generation module into the data packet and transmits the data packet to the receiver device over the PSN.

The receiver device restores the synchronous clock sent by the sender device according to the clock information in the data packet through filtering and clock restoring.

The receiver device includes a disassembly module, a clock information analyzing and filtering module and a clock restoring module.

The disassembly module parses the data packet sent by the sender device according to such information as the MAC address of the data packet and obtains the clock information in the data packet, and transmits the clock information to the clock information analyzing and filtering module.

The clock information analyzing and filtering module filters the clock information transmitted by the disassembly module, generates a clock with jitter according to the clock information and the system clock. The long-term frequency of the cock with clock is the same as the clock to be sent by the sender device. The clock information analyzing and filtering module transmits the clock with jitter to the clock restoring module.

The clock restoring module smoothes the clock with the jitter by using a smoothing mechanism, and restores the synchronous clock sent by the sender device.

Figure 3:
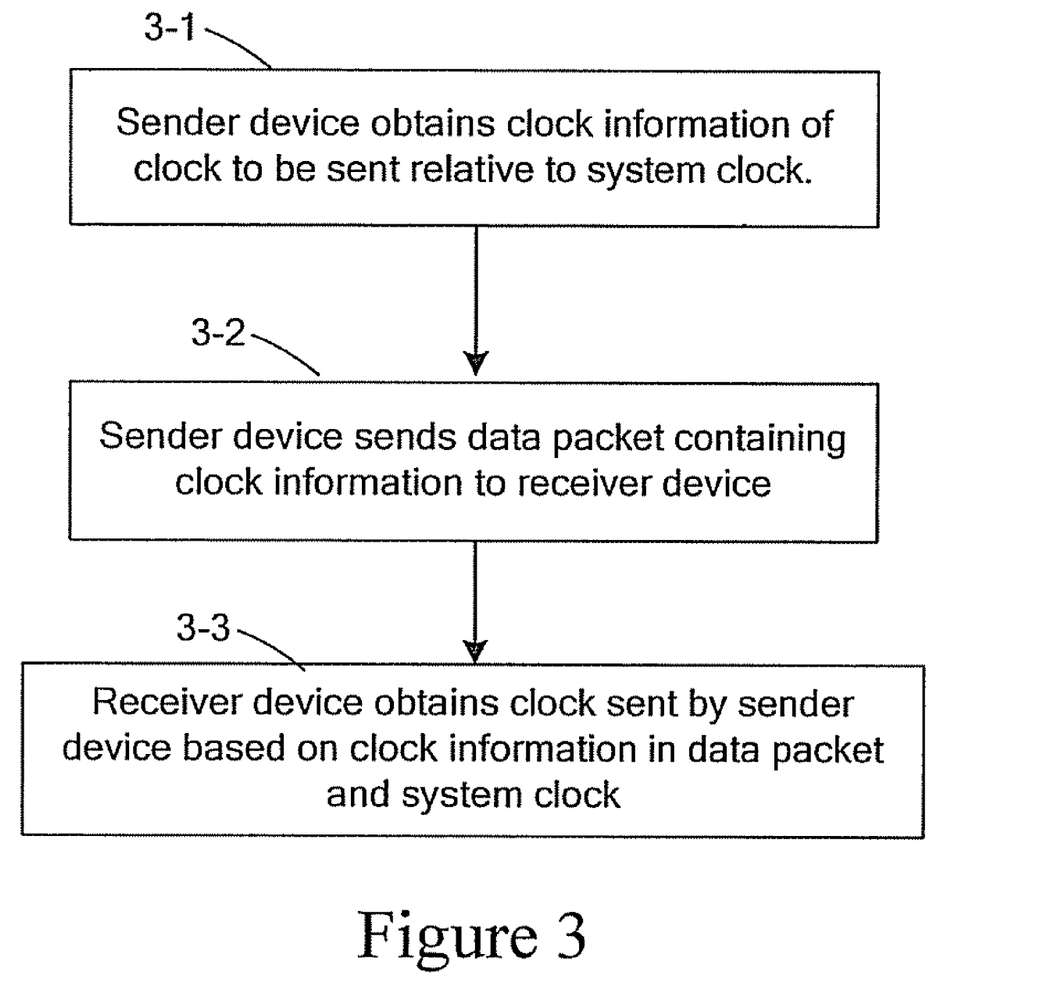
FIG. 3 is a flowchart of the method in accordance with an embodiment of the present invention.

Taking transmitting a 2.048 M clock over the PSN as an example, as shown in FIG. 3, the process of the method in accordance with an embodiment of the present invention is described below.

In Block 3-1, the sender device obtains the clock information of the clock to be sent relative to the system clock.

Firstly, the clock information generation module of the sender device introduces the corresponding container according to the rate of the 2.048 M clock to be sent, adapts the rate of the 2.048 M clock to the rate of the system clock by using the container and obtains the clock information of the 2.048 M clock compared with the system clock. The clock information indicates a positive adjustment, a negative adjustment or no adjustment relative to the system clock, and indicates the adjustment range of the 2.048 M clock relative to the system clock.

The sender device may introduce different containers for different rates of a TDM service, for example, selects Container-11 (C-11) for T1 rate, C-12 for E1 rate, C-3 for E2 rate, C-4 for E3 rate.

Figure 4:
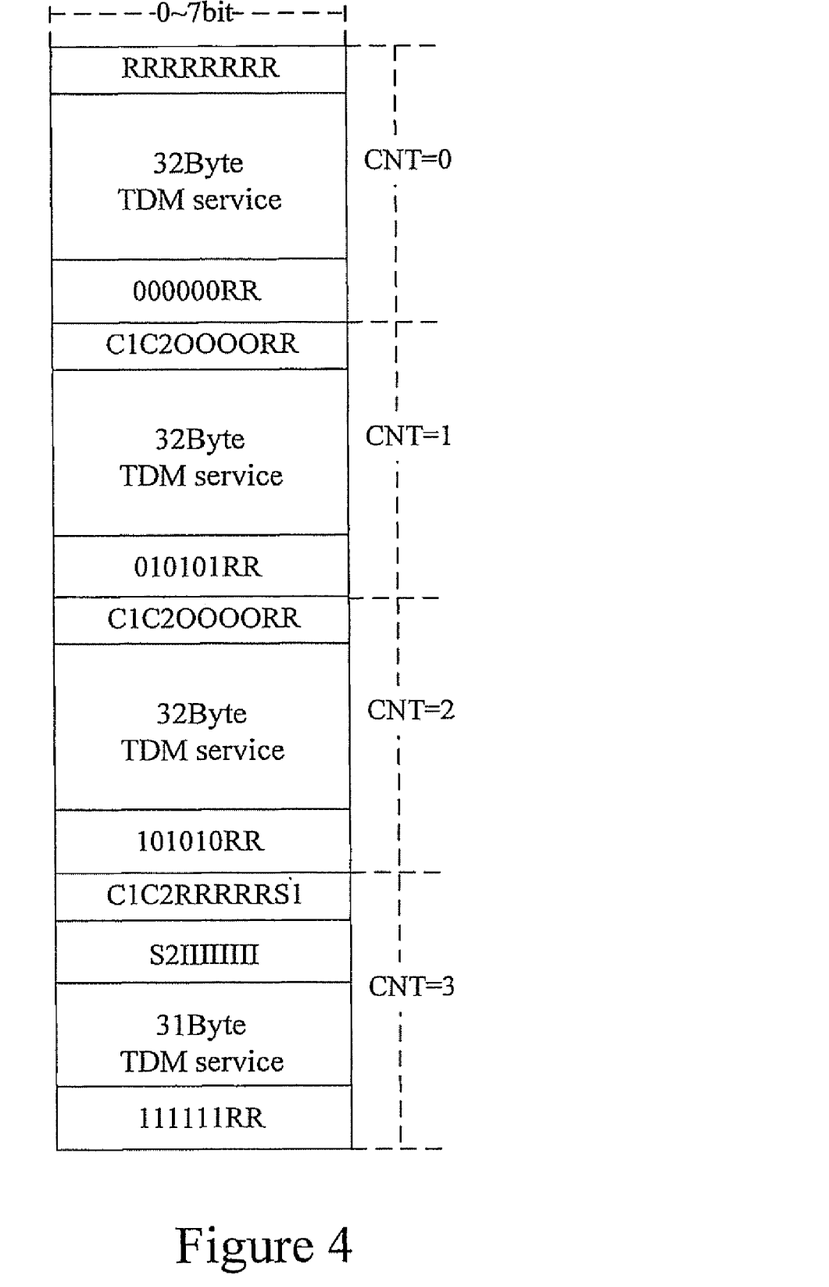
FIG. 4 is a schematic diagram illustrating the multi-frame structure and byte layout of C-12 in accordance with an embodiment of the present invention.

Taking E1 interface for which C-12 is selected as the container as an example. Accordingly, the container structure, the adaptation and adjustment mechanism of C-12 corresponding to E1 is configured. FIG. 4 is a schematic diagram illustrating a multi-frame structure and a byte layout of C-12 in accordance with an embodiment of the present invention. Each E1 has 32 bytes and corresponds to one C-12, and each C-12 has 34 bytes. For an appropriate adjustment range, every four C-12s are connected as a multi-frame. As shown in FIG. 4, 000000, 010101, 101010 and 111111 denote the sequence number of a C-12 in the multi-frame. Except the fixed 32 bytes, the meaning of the other bits is described as follows:

R: a stuffed bit; O: an overhead bit; I: an information bit of the TDM service;

C1: a negative adjustment control bit; S1: a negative adjustment position; C2: a positive adjustment control bit; S2: a positive adjustment position.

For example, if C1C1C1=000, S1=I; if C1=111, S1=R; if C2C2C2=000, S2=I; if C2=111, S2=R.

In the normal condition, S2 is an information bit and its clock would not be adjusted. A positive adjustment is performed when the frequency of the 2.048 M clock has been higher than that of the system clock for a period of time. A negative adjustment is performed when the frequency of the 2.048 M clock has been lower than that of the system clock for a period of time.

The frequency for each positive adjustment is 2K (4 32 8+1)=2K 1025=2.050 MHz, the frequency for each negative adjustment is 2K (4 32 8−1)=2K 1023=2.046 MHz, and the normal frequency without an adjustment is 2K (4 32 8)=2K 1024=2.048 MHz.

Figure 5:
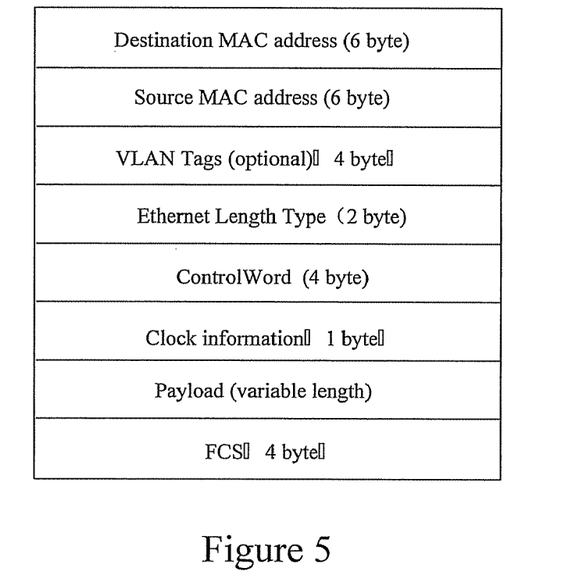
FIG. 5 is a schematic diagram illustrating the frame format of the data packet in accordance with an embodiment of the present invention.

An embodiment of the present invention also provides a frame format of a data packet shown in FIG. 5. As shown in FIG. 5, the clock information is included in the payload of the data packet of the PSN. Specifically, the first 4 bytes in the payload of the data packet is a control word for storing control information, the next 1 byte stores the clock information, and the following stores service data.

The clock information generation module of the sender device transmits the clock information to the packet assembly module of the sender device.

In Block 3-2, the sender device sends the data packet containing the clock information to the receiver device.

The packet assembly module of the sender device includes the clock information in the corresponding field in the frame of the data packet, and meanwhile, encapsulates the service data received into the data packet, and sends the data packet to the receiver device over the PSN.

In Block 3-3, the receiver device restores the clock sent by the sender device according to the clock information in the data packet received and the system clock.

Upon receiving the data packet sent by the sender device over the PSN, the disassembly module of the receiver device parses the data packet received according to such information as the MAC address of the data packet and obtains the clock information in the data packet.

The clock information analyzing and filtering module of the receiver device filters appropriately the clock information to determine that the clock information relative to the system clock needs a positive adjustment, a negative adjustment or no adjustment, and to further determine the corresponding adjustment range. Then the clock information analyzing and filtering module generates a 2.048M clock with jitter according to the clock information and the system clock. The clock restoring module obtains the 2.048 M clock sent by the sender device by smoothing this 2.048M clock with jitter using a smoothing mechanism. The smoothing mechanism may be implemented by several modes, such as a phase-locked loop.

Figure 6:
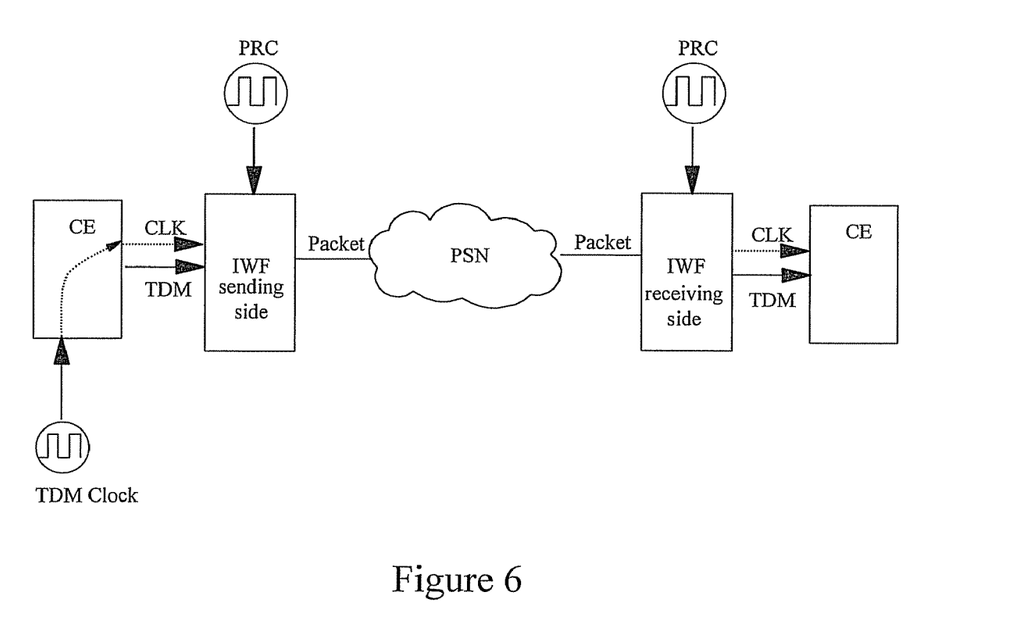
FIG. 6 is a schematic diagram illustrating the application of transmitting a TDM service over a PSN outside a device in accordance with an embodiment of the present invention.

FIG. 6 is a schematic diagram illustrating the application of transmitting a TDM service over a PSN outside a device in accordance with an embodiment of the present invention.

In the application of transmitting the TDM service over the PSN, the Interworking Function (IWF) is a bridge between the TDM network and the PSN, performing the conversion between a TDM service and a packet. In the application of TDM over PSN, in some cases, there is a clock with the same frequency at the receiver and the sender, that is, the system clock of the sender and the receiver is synchronous. In this embodiment, the synchronization between the sender and the receiver is achieved through tracing the Primary Reference Clock (PRC).

The process of sending and restoring the clock in this embodiment is hereinafter described by taking an E1 service as an example. When the TDM service is at other rates, such as T1, E3 and T3, the capacity of the container for rate adaptation may be changed, but the structure thereof is similar to that of C12.

The process of synchronizing the E1 clock by the sender and the receiver in this embodiment is described below.

With respect to the IWF of the sender, the CE receives an E1 service and obtains the 2.048 M clock and E1 data by using an interface processing module. The rate adaptation of E1 to C-12 according to the 2.048 M clock and the system clock is performed to obtain the clock information C1C1C1C2C2C2; the clock information C1C1C1C2C2C2 and the E1 data are encapsulated into a data packet according to the encapsulation format of the data packet shown in FIG. 5, and the data packet is then sent. In the PSN, the data packet encapsulated is processed similarly to processing other Ethernet data packets.

With respect to the IWF of the receiver, the PHY and the MAC receives the data packet according to the MAC address, parses the data packet according to the encapsulation format of the data packet, obtains the E1 data and the clock information C1C1C1C2C2C2, stores the E1 data in the FIFO, and sends the clock information to the clock restoring module. The clock restoring module generates a 2.048 M clock with jitter according to the clock information received and the system clock. The 2.048 M clock with jitter is locked by a phase-locked loop to generate a smooth 2.048 M clock, which is the clock of the E1 service obtained by the receiver device through restoring. The E1 data is output to the CE of the receiver with the smooth 2.048 M clock as the exit clock of the FIFO of the E1 data of the receiver.

Functions of the containers selected for the TDM service at other rates are the substantially the same as those of the container of E1 except that the multi-frame, sub-frame frequency, format and size of the containers may be different.

Figure 7:
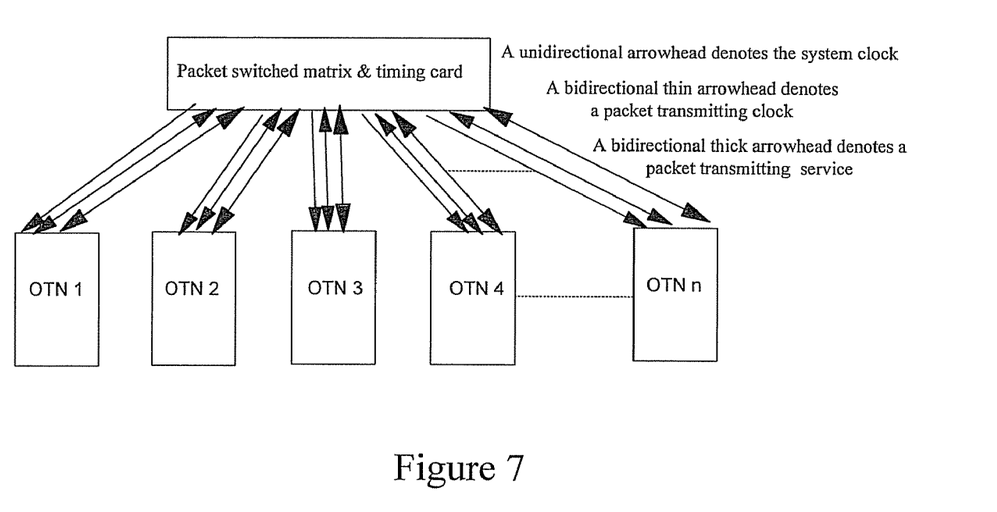
FIG. 7 is a schematic diagram illustrating the application of transmitting a synchronous clock through a packet switched matrix inside a device in accordance with an embodiment of the present invention.

FIG. 7 is a schematic diagram illustrating the application of transmitting a synchronous clock through a packed switched matrix inside a device in accordance with an embodiment of the present invention.

In the OTN switched equipment, an OTN service is sliced to form data packets, and the OTN service is switched by the packet switched matrix. However, the OTN switched equipment needs to switch a clock at the same time. In an embodiment of the present invention, the clock information is switched by the packed switched matrix and no clock circuit switch network is established.

As shown in FIG. 7, the timing card sends, to each line card, the system clock as the common clock of each line card. In an OTN line card, a line clock received from a service is divided to a lower frequency line clock, such as 2.048 M. The lower frequency line clock is adapted to the system clock with an introduced container to obtain the clock information of the line clock relative to the system clock. The clock information obtained is included in a packet, and the packet containing the clock information and the packet containing the service are switched to the destination line card together.

The destination line card obtains the clock information in the packet received and obtains the line clock sent by the sender according to the clock information and the system clock. The line clock is used as the transmit clock of the OTN service.

And in the OTN switched equipment, the clock switching can be realized by a packet switched matrix, and the clock is restored on the line card according to embodiments of the present invention. It can reduce the difficulty and cost of the clock switching.

The foregoing are only preferred embodiments of the present invention. The protection scope of the present invention, however, is not limited to the description above. Any change or substitution, within the technical scope disclosed by the present invention, easily occurring to those skilled in the art should be covered by the protection scope of the present invention.

What is claimed is:

1. A method for clock transmission between a sender and a receiver, comprising:
    generating, by a sender, clock information of a clock relative to a system clock and sending a data packet containing the clock information over a Packet-Switched Network (PSN), wherein the clock is a clock to be sent by the sender;
    obtaining, by a receiver, the clock information in the data packet received and obtaining the clock sent by the sender according to the clock information and the system clock;
    wherein the generating the clock information of the clock relative to the system clock comprises:
        adapting a rate of the clock to be sent with the rate of the system clock using a container, wherein the container is introduced according to the rate of the clock to be sent; and
        obtaining the clock information of the clock relative to the system clock;
    wherein the sending the data packet to the receiver over the PSN comprises:
    including the clock information obtained into a field of a frame of the data packet; and
    sending the data packet containing the clock information to the receiver over the PSN.

2. The method of claim 1, wherein the container introduced is Container-11 (C-11) for T1 rate, is C-12 for E1 rate, is C-3 for E2 rate, and is C-4 for E3 rate.

3. The method of claim 1, wherein the clock information comprises an adjustment direction and an adjustment range of the clock relative to the system clock.

4. The method of claim 3, wherein the obtaining by the receiver the clock information in the data packet received comprises:
    parsing the data packet received to obtain the clock information in the data packet; and
    obtaining the clock sent by the sender according to the clock information and the system clock comprises:
        filtering the clock information to obtain the adjustment direction and the adjustment range of the clock relative to the system clock;
        generating a clock with jitter according to the adjustment direction, adjustment range and the system clock, wherein a long-term frequency of the clock with jitter is the same as the clock sent by the sender; and
        smoothing the clock with jitter to obtain the clock sent by the sender.

5. The method of claim 4, wherein the receiver parses the data packet according to an encapsulation format of the data packet to obtain the clock information in the data packet.

6. The method of claim 4, wherein the smoothing the clock with jitter is implemented by a phase-locked loop.

7. A method for clock transmission between a sender and a receiver, comprising:
    generating, by a sender, clock information of a clock relative to a system clock and sending a data packet containing the clock information over a Packet-Switched Network (PSN), wherein the clock is a clock to be sent by the sender;
    obtaining, by a receiver, the clock information in the data packet received and obtaining the clock sent by the sender according to the clock information and the system clock; wherein the sender is an Interworking Function (IWF) at the sending side, the receiver is an IWF at the receiving side and the system clock is a Primary Reference Clock (PRC) when the PSN transmits a Time Division Multiplex (TDM) service; and
    the sender is an Optical Transport Network (OTN) line card at the source side, the receiver is an OTN line card at the destination side and the system clock is distributed by a timing card when the PSN is a packet switched matrix in a device.

8. A system for clock transmission between a sender and a receiver, comprising:
    a first device as a sender, for generating clock information of a clock relative to a system clock and sending a data packet containing the clock information over in a Packet-Switched Network (PSN), wherein the clock is a clock to be sent by the sender; and
    a second device as a receiver, for obtaining the clock information in the data packet sent by the first device, and obtaining the clock sent by the first device according to the clock information and the system clock;
    wherein the first device comprises:
        a clock information generation module, for introducing a container according to a rate of the clock to be sent, adapting the rate of the clock to the rate of the system clock using the container and obtaining the clock information of the clock relative to the system clock, and sending the clock information; and
        a packet assembly module, for encapsulating the clock information sent by the clock information generation module into the data packet and sending the data packet to the second device.

9. The system of claim 8, wherein the clock information comprises an adjustment direction and an adjustment range of the clock relative to the system clock.

10. A system for clock transmission between a sender and a receiver, comprising:
    a first device as a sender, for generating clock information of a clock relative to a system clock and sending a data packet containing the clock information over in a Packet-Switched Network (PSN), wherein the clock is a clock to be sent by the first device; and
    a second device as a receiver, for obtaining the clock information in the data packet sent by the first device, and obtaining the clock sent by the first device according to the clock information and the system clock;
    wherein the second device comprises:
        a disassembly module, for parsing the data packet sent by the first device, obtaining the clock information in the data packet, and sending the clock information;
        a clock information analyzing and filtering module, for filtering the clock information sent by the disassembly module, generating a clock with jitter according to the clock information and the system clock, and sending the clock with jitter, wherein a long-term frequency of the cock with jitter is the same as the clock sent by the first device; and a clock restoring module, for smoothing the clock with jitter using a smoothing mechanism and restoring the clock sent by the first device.

11. A system for clock transmission between a sender and a receiver, comprising:

a first device as a sender, for generating clock information of a clock relative to a system clock and sending a data packet containing the clock information over in a Packet-Switched Network (PSN), wherein the clock is a clock to be sent by the first device; and a second device as a receiver, for obtaining the clock information in the data packet sent by the first device, and obtaining the clock sent by the first device according to the clock information and the system clock;

wherein the first device comprises:

a clock information generation module, for introducing a container according to a rate of the clock to be sent, adapting the rate of the clock to the rate of the system clock using the container and obtaining the clock information of the clock relative to the system clock, and sending the clock information; and a packet assembly module, for encapsulating the clock information sent by the clock information generation module into the data packet and sending the data packet to the second device; and wherein the PSN comprises an Ethernet, an Internet Protocol (IP) network, a Digital Subscriber Line Access Multiplexer (DSLAM) network, a Passive Optical Network (PON), an Asynchronous Transfer Mode (ATM) network and a packed switched matrix inside a device.

12. A system for clock transmission between a sender and a receiver, comprising:

a first device as a sender, for generating clock information of a clock relative to a system clock and sending a data packet containing the clock information over in a Packet-Switched Network (PSN), wherein the clock is a clock to be sent by the first device; and a second device as a receiver, for obtaining the clock information in the data packet sent by the first device, and obtaining the clock sent by the first device according to the clock information and the system clock;

wherein the first device is an Interworking Function (IWF) at the sending side, the second device is an IWF at the receiving side and the system clock is a Primary Reference Clock (PRC); or the first device is an Optical Transport Network (OTN) line card at the source side, the second device is an OTN line card at the destination side and the system clock is distributed by a timing card.

13. A device for clock transmission, comprising:

one or more components for generating clock information of a clock to be sent relative to a system clock and sending a data packet containing the clock information over a Packet-Switched Network (PSN) to a second device; wherein the second device obtains the clock information in the data packet and obtains the clock sent by the device according to the clock information and the system clock; and wherein the one or more components comprise:

a clock information generation module, for introducing a container according to a rate of the clock to be sent, adapting the rate of the clock to the rate of the system clock using the container and obtaining the clock information of the clock relative to the system clock, and sending the clock information; and a packet assembly module, for encapsulating the clock information sent by the clock information generation module into the data packet and sending the data packet.

14. The device of claim 13, further comprising:

one or more components for obtaining clock information of a clock relative to a system clock in a data packet received from another device and obtaining the clock sent by said another device according to the clock information and the system clock.

15. A device for clock transmission, comprising:

one or more components for obtaining clock information of a clock relative to a system clock in a data packet received, and obtaining the clock according to the clock information and the system clock, wherein the clock is sent by a second device; and wherein the one or more components comprise:

a disassembly module, for parsing the data packet received, obtaining the clock information in the data packet, and sending the clock information;

a clock information analyzing and filtering module, for filtering the clock information sent by the disassembly module, generating a clock with jitter according to the clock information and the system clock, and sending the clock with jitter, wherein a long-term frequency of the cock with jitter is the same as the clock sent by the second device; and a clock restoring module, for smoothing the clock with jitter using a smoothing mechanism and restoring the clock sent by the second device.

16. The device of claim 15, further comprising:

one or more components, for generating clock information of a clock to be sent relative to a system clock and sending a data packet containing the clock information over a Packet Switched Network (PSN) to another device.

* * * * *